United States Patent
Bocher et al.

(10) Patent No.: US 12,326,611 B2
(45) Date of Patent: Jun. 10, 2025

(54) ADJUSTING DEVICE

(71) Applicant: PHYSIK INSTRUMENTE (PI) SE & CO. KG, Karlsruhe (DE)

(72) Inventors: Thomas Bocher, Karlsruhe (DE); Lukas Rau, Waldbronn (DE); Tomas Navratil, Karlsruhe (DE); Michael Ernst, Straubenhardt (DE); Axel Grabowski, Rutesheim (DE); Matthias Schulz, Waldbronn (DE)

(73) Assignee: PHYSIK INSTRUMENTE (PI) SE & CO. KG (DE)

( * ) Notice: Subject to any disclaimer, the term of this patent is extended or adjusted under 35 U.S.C. 154(b) by 451 days.

(21) Appl. No.: 17/785,949

(22) PCT Filed: Dec. 9, 2020

(86) PCT No.: PCT/EP2020/085260
§ 371 (c)(1),
(2) Date: Jun. 16, 2022

(87) PCT Pub. No.: WO2021/122215
PCT Pub. Date: Jun. 24, 2021

(65) Prior Publication Data
US 2023/0013386 A1 Jan. 19, 2023

(30) Foreign Application Priority Data
Dec. 20, 2019 (DE) .................... 10 2019 220 429.5

(51) Int. Cl.
*G02B 7/08* (2021.01)
*G01B 21/00* (2006.01)
(Continued)

(52) U.S. Cl.
CPC ............... *G02B 7/08* (2013.01); *G01B 21/00* (2013.01); *H01R 13/6205* (2013.01);
(Continued)

(58) Field of Classification Search
CPC ...... G02B 7/08; G02B 21/00; H01R 13/6205; H01R 13/627; H01R 35/00; H02K 49/108
See application file for complete search history.

(56) References Cited

U.S. PATENT DOCUMENTS 3,521,216 A * 7/1970 Tolegian ............ H01R 13/6205
439/675
3,786,391 A * 1/1974 Mathauser ......... H01R 13/6205
439/246
(Continued)

FOREIGN PATENT DOCUMENTS

DE         10005748 A1    8/2001
DE    202009017832 U1    7/2010
(Continued)

OTHER PUBLICATIONS

Office Action issued in the corresponding German Patent Application No. 10 2019 220 429.5; Mar. 2, 2023 (total 13 pages).
(Continued)

*Primary Examiner* — Thanh Tam T Le
(74) *Attorney, Agent, or Firm* — Harness, Dickey & Pierce, P.L.C.

(57) ABSTRACT

An adjusting device is provided for positioning an object. The adjusting device includes a base and a supply line. The base is configured to move an object that is connectable to the base in the connected state along a path of motion in a position-controlled manner. The supply line supplies the energy and/or signal transmission to and/or from the base. The supply line is coupled to the base in a reversibly detachable manner.

16 Claims, 5 Drawing Sheets

(51) Int. Cl.
*H01R 13/62* (2006.01)
*H01R 13/627* (2006.01)
*H01R 35/00* (2006.01)
*H02K 49/10* (2006.01)

(52) U.S. Cl.
CPC ........... *H01R 13/627* (2013.01); *H01R 35/00* (2013.01); *H02K 49/108* (2013.01)

(56) References Cited

U.S. PATENT DOCUMENTS

| | | | | | |
|---|---|---|---|---|---|
| 3,808,577 | A | * | 4/1974 | Mathauser | H01R 13/6205 439/246 |
| 7,341,458 | B1 | * | 3/2008 | Koh | H01R 13/2421 439/39 |
| 7,775,801 | B2 | * | 8/2010 | Shiff | H01R 13/6205 439/700 |
| 8,651,876 | B2 | * | 2/2014 | Mysliwiec | H01R 13/6205 439/39 |
| 9,300,083 | B2 | * | 3/2016 | Bosscher | H01R 25/003 |
| 9,478,901 | B2 | * | 10/2016 | Chen | H01R 13/22 |
| 9,735,500 | B2 | * | 8/2017 | Magana | H01R 13/64 |
| 9,941,627 | B2 | * | 4/2018 | Esmaeili | H01R 13/5213 |
| 10,019,034 | B2 | * | 7/2018 | Barnett | G06F 3/0338 |
| 10,135,179 | B2 | * | 11/2018 | Cooper | A47J 27/2105 |
| 10,658,789 | B1 | * | 5/2020 | Wang | H01R 24/28 |
| 10,658,793 | B2 | * | 5/2020 | Blake | G06F 1/18 |
| 11,495,912 | B2 | * | 11/2022 | Bondurant | H01R 31/06 |
| 2017/0093104 | A1 | | 3/2017 | Powers et al. | |

FOREIGN PATENT DOCUMENTS

| | | |
|---|---|---|
| DE | 102011121928 A1 | 2/2013 |
| DE | 102012212254 B3 | 1/2014 |
| DE | 202014010480 U1 | 9/2015 |
| DE | 102014216783 A1 | 2/2016 |
| EP | 3133213 A1 | 2/2017 |

OTHER PUBLICATIONS

Physik-Instrumente, "User Manual P-725 PIFOC Long-Travel Objective Scanner P-725.xDD PIFOC High-Dynamics Piezo Scanner Aug. 25, 2017 P725T0010, valid for P-725 Contents", Aug. 25, 2017 (Aug. 25, 2017), pp. 1-25, URL: https://usermanual.wiki/Physik-Instrumente/P725UserManualP725T0010pdf.1449407114.pdf XP055778734.
International Search Report (English and German) issued in PCT/EP2020/085260, mailed Mar. 4, 2021; ISA/EP (6 pages).

* cited by examiner

ADJUSTING DEVICE

CROSS REFERENCE TO RELATED APPLICATIONS

This application is a U.S. National Phase Application under 35 U.S.C. 371 of International Application No. PCT/EP2020/085260, filed on Dec. 9, 2020, which claims priority to German Patent Application No. 102019220429.5, filed on Dec. 20, 2019. The entire disclosures of the above applications are expressly incorporated by reference herein.

BACKGROUND

Technical Field

The present invention relates to an adjusting device for positioning an object.

Related Art

Adjusting devices in the form of lens adjusters are used in microscopes. Conventional transmitted-light or reflected-light microscopes generally comprise several lenses mounted on a rotatable lens turret, at least one of which can be provided with such a lens adjuster. Due to the rotating function of the lens turret, the desired lens can be positioned between the eyepiece and the specimen, whereby a motorized motion of the respective lens along its direction of focus can be realized with the aid of the lens adjuster.

Energy or signals are transmitted via a supply line from or to a base of the lens adjuster for moving a lens which is connected to the base along its direction of focus in a position-controlled manner.

Due to the magnitude of the voltages applied and the susceptibility of the signal transmission to interference, the supply line in conventional lens adjusters is connected permanently to the base.

It has there turned out to be disadvantageous that the cables of the supply line experience damaging mechanical forces in the event of an unforeseen rotation of the lens turret, as occurs, for example, during initialization after a restart. The cable strain relief, which is of a small size due to the compact installation space, cannot absorb the mechanical loads in all cases as required. As a result, a cable break or other damage to the power supply or energy transmission line(s) and/or the sensitive sensor or signal transmission line(s) arises.

It is therefore the object of the present invention to provide an adjusting device that ensures long-term reliability and longevity of the energy and/or signal transmission line(s) and facilitates handling.

SUMMARY

To satisfy this objective, the present invention provides the adjusting device for positioning an object, comprising: a base which is configured to move an object that is connectable to the base in the connected state along a path of motion in a position-controlled manner, and a supply line for energy and/or signal transmission to and/or from the base, where the supply line is coupled to the base in a reversibly detachable manner. As a result of this configuration, the supply line detaches from the base when a specific tensile or compressive force acting upon the supply line is exceeded, thereby preventing damage to the supply line and/or the base. In addition, there is the advantage that the supply line can be manually detached from the base or connected to the base, which facilitates handling when installing the adjusting device.

Advantageous configurations of the invention claimed are the objects of the dependent claims.

It can be advantageous to have the adjusting device comprise a coupling device, via which the supply line is coupled to the base in a reversibly detachable manner, comprising a first coupling section that is fixedly connected to the base and a second coupling section that is fixedly connected to the supply line A clear interface at which the supply line can be detached from the base can be provided with the connecting device when the specific tensile or compressive force is exceeded.

It can be useful to have a coupling axis, along which the first and the second coupling sections can be coupled and/or decoupled, be oriented to be perpendicular to the path of motion. In microscopy application, the adjusting device rotates in the form of a lens adjuster about an axis that is approximately parallel to the path of motion. By aligning the coupling axis to be perpendicular to the path of motion, the tensile or compressive forces exerted upon the supply line act upon the coupling device under favorable conditions, so that the defined detachability of the first coupling section from the second coupling section is improved.

Moreover, it can prove practical to have a dividing plane, along which the first and the second coupling sections are divided, be oriented to be parallel to the path of motion. This configuration also contributes to favorable force conditions at the coupling device, which improves the defined detachability of the first coupling section from the second coupling section.

It can prove to be advantageous to have the coupling device be arranged on a surface of the base that faces away from the path of motion. Such a surface of the base is easily accessible and allows for easy manual coupling or decoupling of the first and the second coupling sections.

It can be useful to have the first coupling section be connected to the base by way of a cable for the energy and signal transmission. This configuration expands the range of motion of the adjusting device before the first and the second coupling section are decoupled due to the determined tensile or compressive force acting upon the supply line being exceeded.

It can be useful to have the first and the second coupling section be coupled magnetically. This allows for simple and safe coupling and decoupling to be implemented.

It can also be useful to have at least one of the two coupling sections comprise at least one permanent magnet or at least one electromagnet. Simple manual coupling or decoupling can be achieved using a permanent magnet. Since an electromagnet can be activated or deactivated in a selective manner by way of a suitable control device, there is the option of linking the ability to be coupled or automatic decoupling to various ancillary conditions detected by the control device. For example, the control device can trigger automatic decoupling when a specific angle of rotation of the adjusting device about its axis of rotation is exceeded.

It can be advantageous if the two coupling sections can be coupled to one another by frictional engagement or a positive-fit connection. It can presently be particularly advantageous to have one of the two coupling sections, preferably the first coupling section, be configured as a female coupling section and the other of the two coupling sections be configured as a male coupling section.

It can also prove to be practical to have the female coupling section be configured as a connector receptacle with depressions and/or projections and the male coupling section be configured as a connector with depressions and/or projections. Protection against accidental contact can be ensured in accordance with the CE standard by the configuration of such pins and plug-in sockets.

It can prove to be useful to have contacts for energy and/or signal transmission be arranged in the shape of a circle in both coupling sections. This arrangement and respective spacings between the contacts ensure that the sensor signal is safe from flashover and has a high signal quality. It can also be advantageous to have at least a portion of the first coupling section be configured to be rotatable and preferably lockable at different rotational positions. This allows the second coupling section to be coupled to the first coupling section in different orientations relative to the base.

It can be useful to have the base comprise a drive unit, that is configured to receive the object, preferably in the form of a lens, and to move it along the path of motion, and a position sensor that is configured to detect the position of the object along the path of motion, where the path of motion runs preferably along the direction of focus of the lens.

It can be useful to have the drive unit be a piezoelectric motor.

It can prove to be practical to have the supply line comprise several separate conductors for energy and/or signal transmission in a common jacket.

It can be advantageous to have the supply line comprise a connector for connection to an external device. This makes it easy to establish a connection to the external device.

Further embodiments arise from a combination of the advantageous embodiments.

Although the adjusting device is described substantially with reference to a lens adjuster, the invention can be transferred to all adjusting devices that are configured to move an object along a path of motion in a position-controlled manner.

DETAILED DESCRIPTION

Figure 1A:
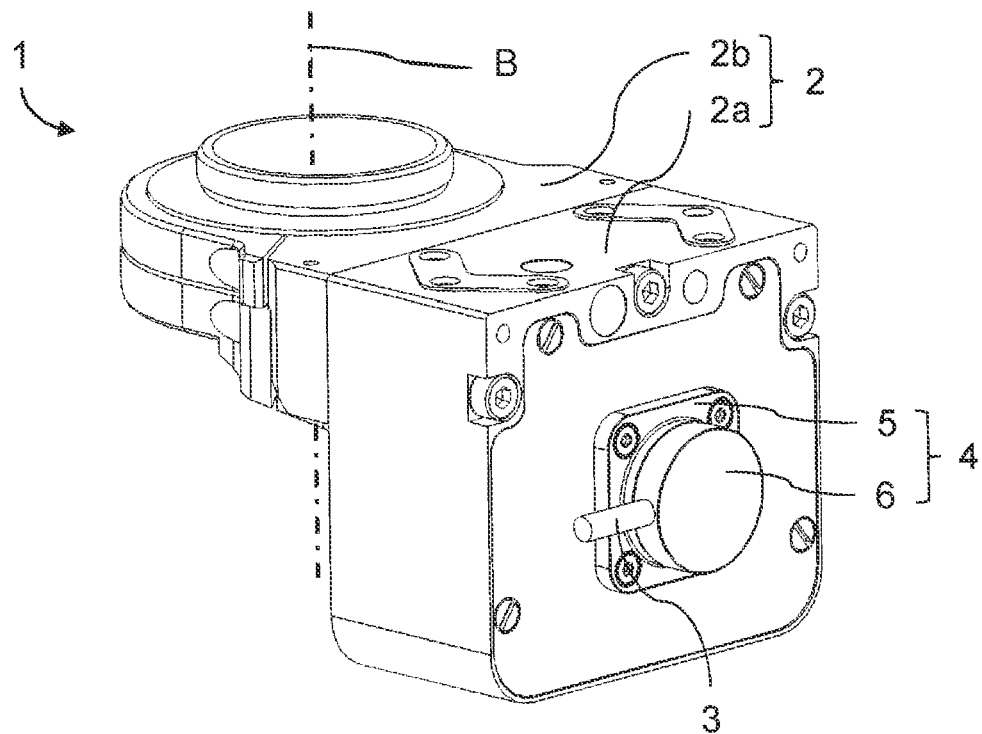
FIGS. 1A and 1B show a first embodiment of the adjusting device according to the invention in the form of a lens adjuster in which the first coupling section is arranged on a side surface of the base facing away from the path of motion.
Figure 1B:
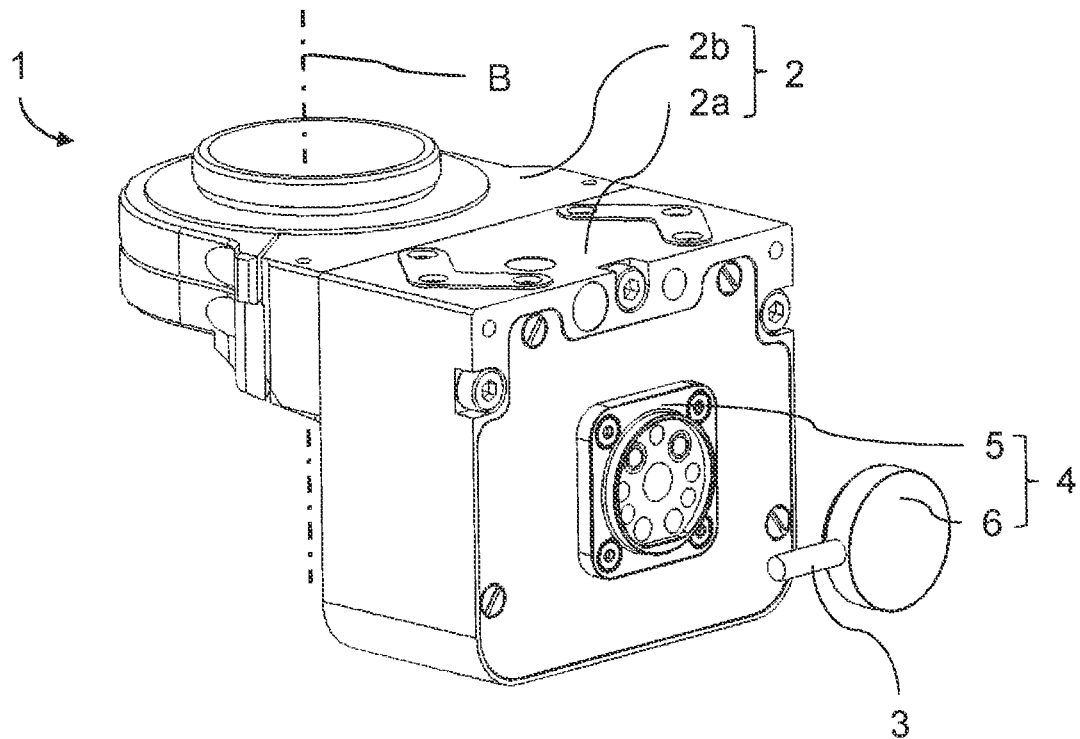

A first embodiment of an adjusting device according to the invention in the form of a lens adjuster 1 is shown in FIGS. 1A and 1B. Lens adjuster 1 comprises a base 2 composed of a base main body 2a and a drive unit 2b. Base main body 2a is formed to be approximately cuboid and connected to drive unit 2b by way of a side surface. Drive unit 2b comprises a ring-shaped receptacle that is configured to receive a lens. The lens can be, for example, screwed, pressed or glued into the ring-shaped receptacle. The lens received can be moved from base 2 along a path of motion B in a position-controlled manner. For this purpose, base 2 additionally comprises a position sensor. Furthermore, lens adjuster 1 comprises a supply line 3 for energy and/or signal transmission to and/or from base 2, where it is possible for supply line 3 to be formed from a number of individual conductors which are accommodated in a common jacket. Supply line 3 preferably comprises a connector 8 (see FIGS. 5A and 5B) at the end facing away from the base for connection to an external device, in particular an energy and signal source. Supply line 3 is coupled in a reversibly detachable manner to base main body 2a. In particular, this detachability is realized by way of a coupling device 4. For this purpose, coupling device 4 consists of a first coupling section 5 and a second coupling section 6 which, in the coupled state, enable energy and signal transmission between supply line 3 and base 2.

In the present embodiment, first coupling section 5 is arranged on an outer surface of base main body 2a on the rear side or on an outer surface facing away from path of motion B. First coupling section 5 consists of a plate that is attached on the outer surface of base main body 2a, preferably by screw connections, and a hollow cylindrical projection in the form of a circumferential ridge projecting from the plate. First coupling section 5 is configured as a female coupling section. For this purpose, indentations or plug-in sockets are formed in a region of the plate which is enclosed by the circumferential ridge and form contacts for the energy and signal transmission. The indentations are preferably circular and concentric to the circumferential ridge.

Second coupling section 6 is configured as a flat cylinder and represents a male coupling section. One end face of the cylinder comprises pin-like projections or pins which are configured as contacts for the energy and signal transmission and in the coupled state are plugged into the plug-in sockets of first coupling section 5. Supply line 3 enters the interior of second coupling section 6 via the lateral surface of cylindrical second coupling section 6, where the individual conductors of supply line 3 are in communication with the corresponding pins. In addition, second coupling section 6 has a circumferential groove on the end face on which the pins are also provided. In the coupled state, the circumferential ridge of first coupling section 5 is in engagement with the circumferential groove of second coupling section 6.

The plug-in sockets of first coupling section 5 and the pins of second coupling section 6, which form the contacts for the energy and signal transmission, are preferably configured having different diameters, for example, such that first coupling section 5 and second coupling section 6 can be coupled to each other only in one possible orientation. This ensures that the contacts are connected according to their type, i.e. energy or signal transmission contact, and in the case of energy transmission contacts according to their polarity.

In order to ensure reliable coupling of two coupling sections 5, 6, at least one of coupling sections 5, 6 can be configured as a magnet or can comprise magnetic elements so that two coupling sections 5, 6 can be coupled magnetically. They can be both permanent as well as electromagnets. Alternatively, it is also possible for two coupling sections 5, 6 to be realized solely by mechanical clamping, for example, by configuring at least one coupling element in the form of a ball socket, a static friction element, or a spring element.

Figure 2:
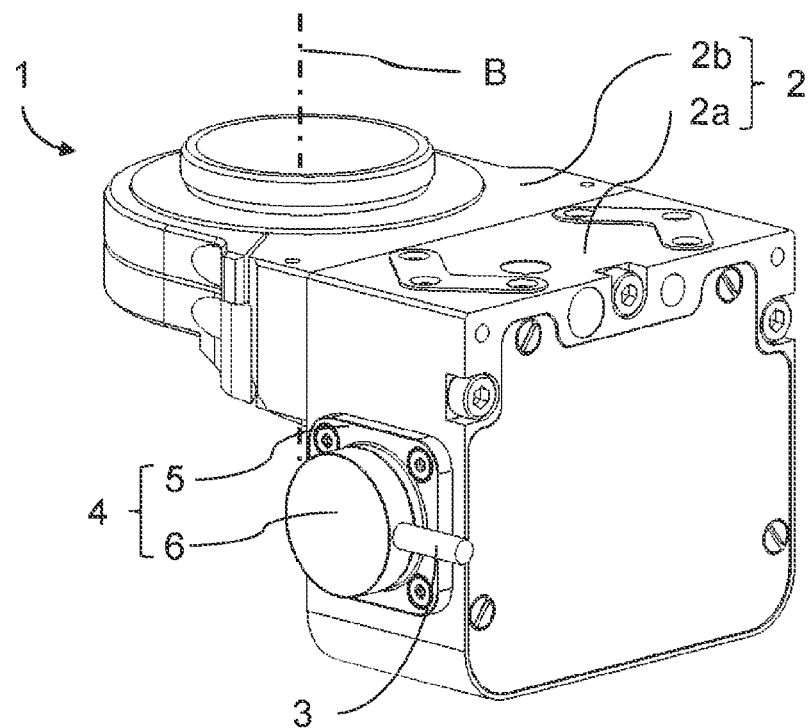
FIGS. 2 and 3 each show a modification of the first embodiment of the adjusting device according to the invention in which the first coupling section is respectively arranged on a different side surface of the base.
Figure 3:
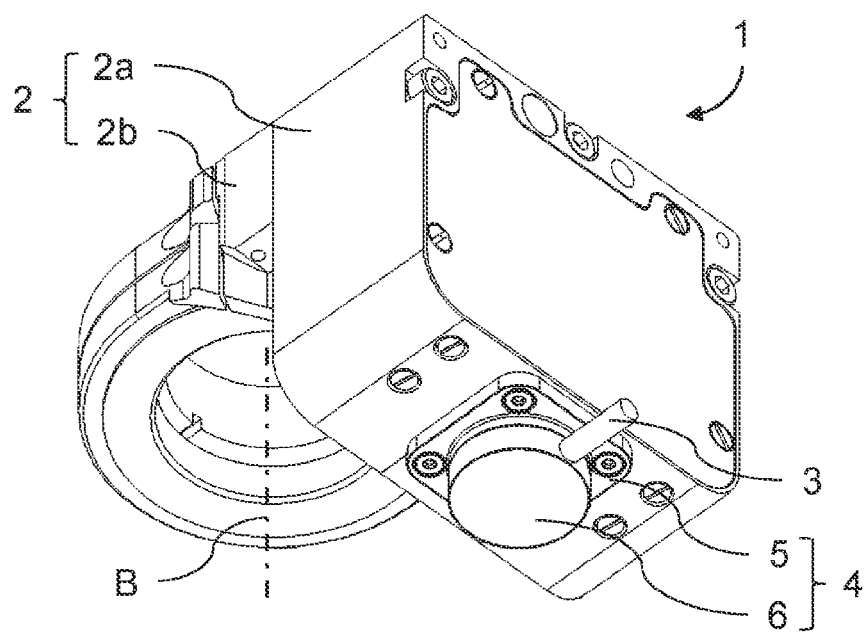

The invention is not restricted to a configuration in which first coupling section 5 is arranged on a rear outer surface of base main body 2a. Depending on the application, in particular first coupling section 5 can also be arranged on other surfaces of base main body 2a, as shown in FIGS. 2 and 3 by way of example.

Figure 4A:
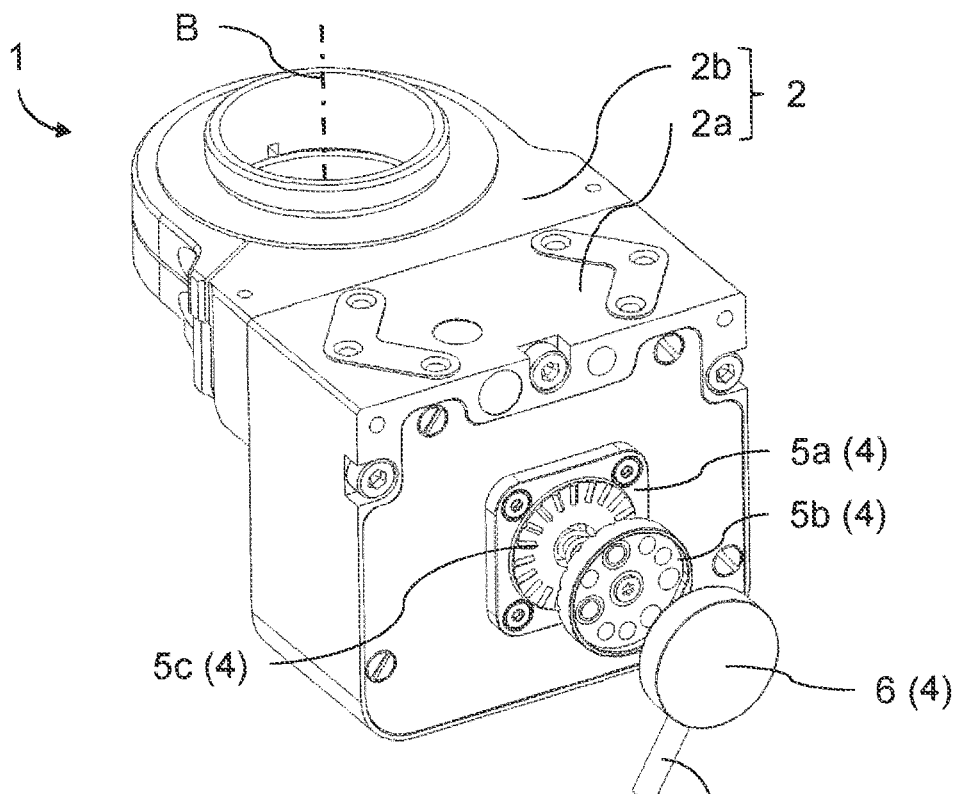
FIGS. 4A to 4D show a second embodiment of the adjusting device according to the invention in the form of a lens adjuster in which at least a portion of the first coupling section is configured to be rotatable and lockable so that the second coupling section can be coupled to the first coupling section in different orientations relative to the base.

FIG. 4A shows a second embodiment of the adjusting device in the form of a lens adjuster 1 in which at least a portion of first coupling section 5 is configured to be rotatable and lockable. For this purpose, the first coupling section consists in particular of a base plate 5a, a rotatable attachment 5b, and a tension spring 5c which tensions rotatable attachment 5b against base plate 5a. Base plate 5a is attached to a side surface of base main body 2a like in the first embodiment. On the surface facing away from base main body 2a, base plate 5a is provided with projections which are arranged in the shape of a circle and are equally spaced. Rotatable attachment 5b is configured as a flat hollow cylinder with a bottom and on the surface of the bottom facing base plate 5a comprises corresponding depressions or notches which in the non-deflected state of spring 5c engage with the projections of base plate 5a. The contacts for energy and signal transmission are provided in the bottom of rotatable attachment 5b. Spring 5c connects the centers of base plate 5a and rotatable attachment 5b. By an axial deflection of spring 5c, rotatable attachment 5b can be raised from base plate 5a against the pretension of spring 5c. In this state, rotatable attachment 5b can be rotated and re-engaged with base plate 5a in any orientation corresponding to the projections and notches once the spring tension has been yielded to. In the non-deflected state of spring 5c, rotatable attachment 5b is connected to base plate 5a in a non-rotational manner.

It goes without saying that the projections and notches can have any shape as long as they can be made to engage with each other. Furthermore, rotatable attachment 5b can also comprise the projections and base plate 5a can comprise the depressions or a combination thereof. In the present embodiment, the base plate comprises 24 projections and 24 notches corresponding to the rotatable attachment so that rotatable attachment 5b can be oriented in 24 different positions relative to base plate 5a. Accordingly, second coupling section 6 can be oriented in 24 different positions relative to base main body 2a. The number of different positions is by way of example and can be adapted to the respective application by adjusting the number and the spacing of the projections and notches. In particular, locks in four positions that differ by 90° can also be useful.

Figure 4B:
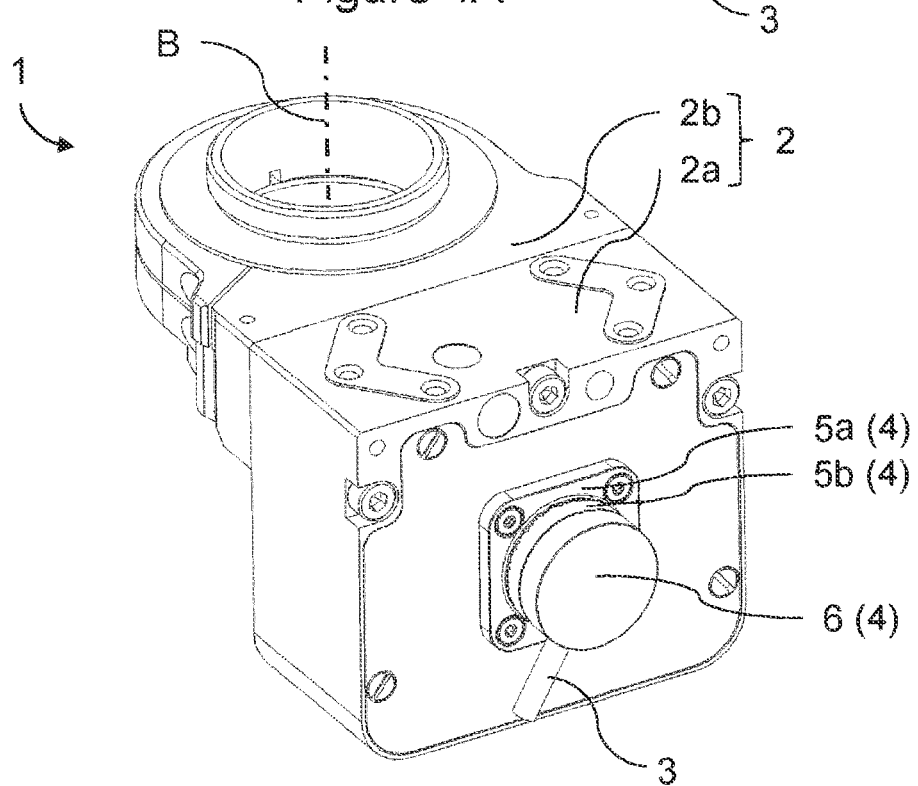
Figure 4C:
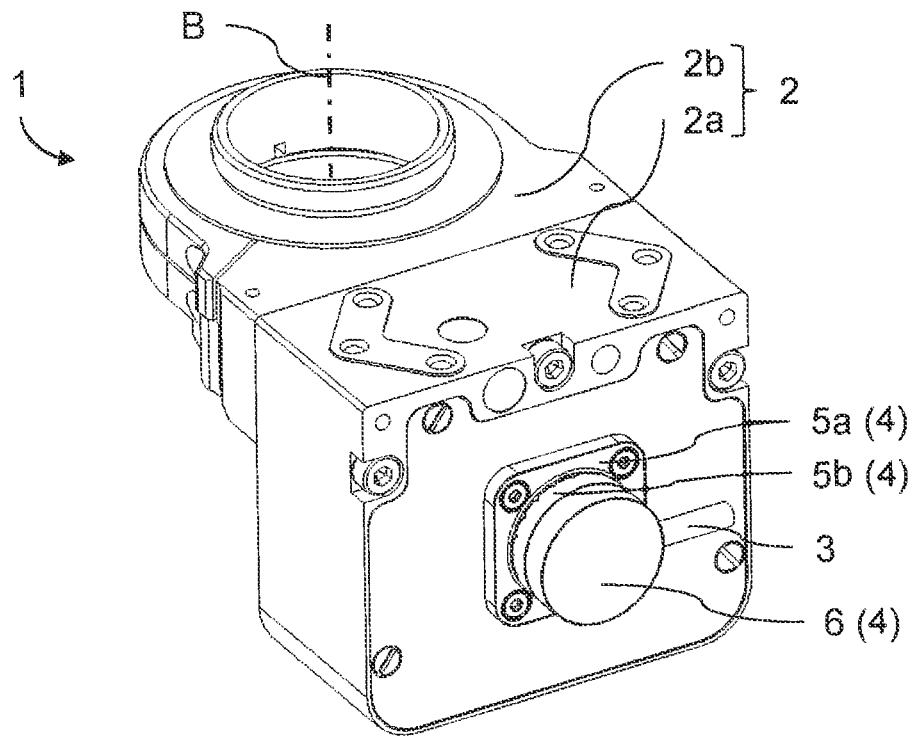
Figure 4D:
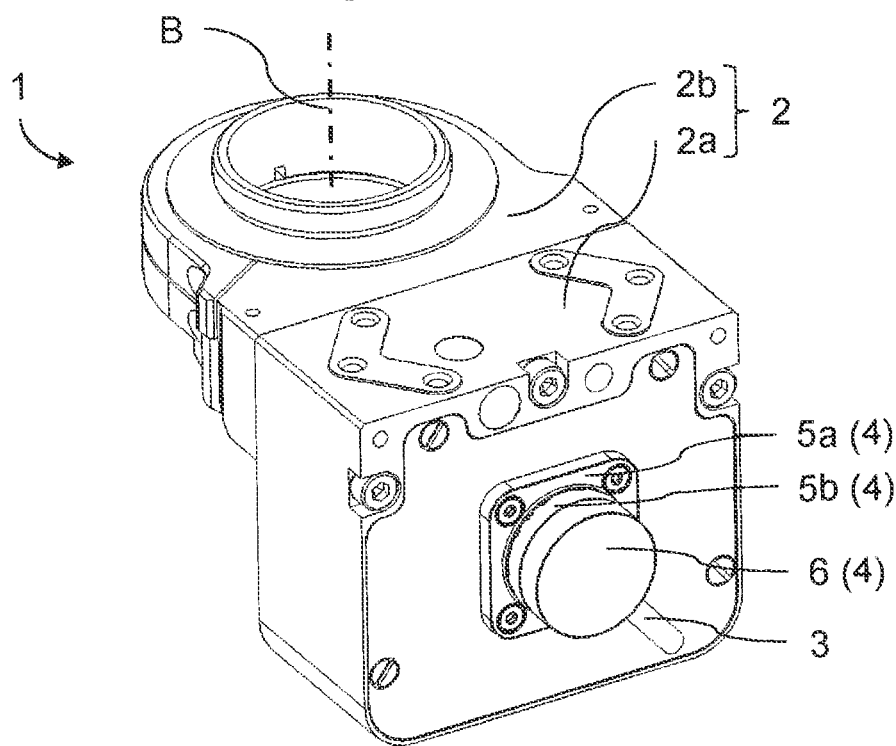

FIGS. 4B to 4D show various orientations of second coupling section 6 relative to base main body 2a by way of example.

Figure 5A:
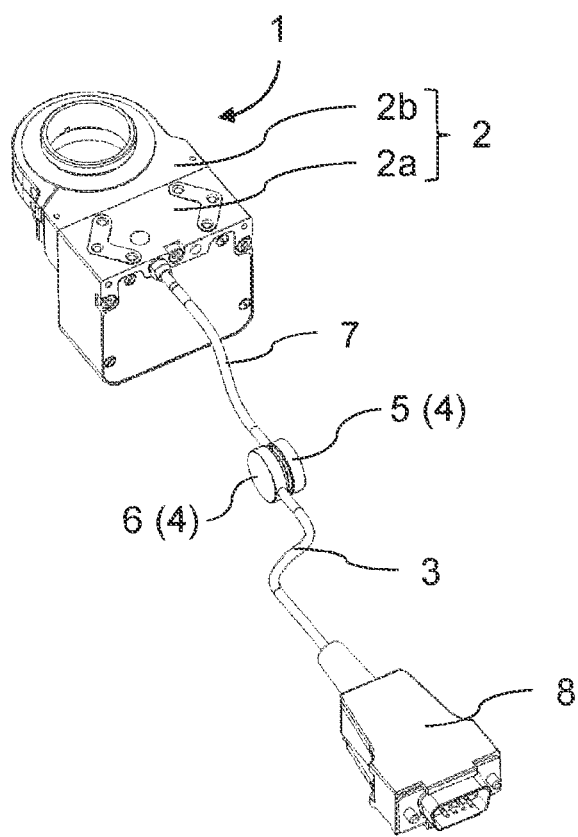
FIGS. 5A and 5B show a third embodiment of the adjusting device according to the invention in the form of a lens adjuster in which the first coupling section is connected to the base by way of a cable for the energy and signal transmission.
Figure 5B:
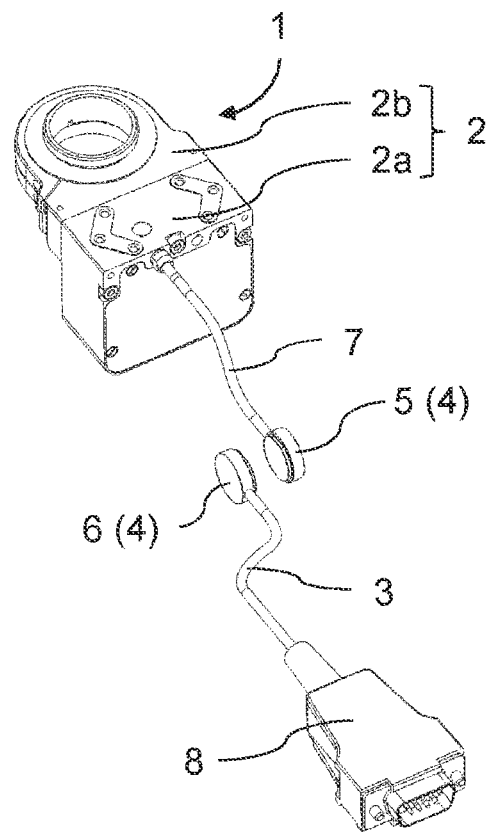

A third embodiment of the adjusting device in the form of a lens adjuster 1 is shown in FIGS. 5A and 5B. In this embodiment, first coupling section 5 is not directly attached to an outer surface of base main body 2a, but is connected by way of a cable 7 for the energy and signal transmission to base 2 on the side or outer surface of base main body 2a facing forward. It is conceivable that cable 7 is also arranged on one of the other sides or outer surfaces of the base main body. First coupling section 5 is formed as a flat cylinder and can be coupled to second coupling section 6 as described in the previous embodiments. Analogously to the connection of supply line 3 to second coupling section 6, cable 7 enters first coupling section 5 via the lateral surface of the cylinder, where the individual conductors of cable 7 are distributed to the corresponding contacts within first coupling section 5. FIG. 5A shows coupling sections 5 and 6 in the coupled state, whereas FIG. 5B shows the uncoupled state. In addition, FIGS. 5A and 5B show connector 8 which is attached to the other end of supply line 3 and is used to connect supply line 3 to an external device.

The invention claimed is:

1. An adjusting device for positioning an object, the adjusting device comprising:
   a base which is configured to move an object that is connectable to the base in a connected state along a path of motion in a position-controlled manner; and
   a supply line for conveying energy and/or signal transmission to and/or from the base,
   wherein the supply line is coupled to the base in a reversibly detachable manner,
   wherein the object is a lens; and
   the base comprises:
      a drive unit that is configured to receive the lens and to move the lens along the path of motion; and
      a position sensor that is configured to detect the position of the lens along the path of motion,
   wherein the path of motion runs along a direction of focus of the lens.

2. The adjusting device according to claim 1, wherein the adjusting device further comprises:
   a coupling device, via which the supply line is coupled to the base in the reversibly detachable manner,
   the coupling device including a first coupling section that is fixedly connected to the base and a second coupling section that is fixedly connected to the supply line.

3. The adjusting device according to claim 2, wherein a coupling axis, along which the first and the second coupling section are selectively coupled and/or decoupled, is oriented to be perpendicular to the path of motion.

4. The adjusting device according to claim 2, wherein a dividing plane, along which the first and the second coupling sections are divided, is oriented to be parallel to the path of motion.

5. The adjusting device according to claim 2, wherein the coupling device is arranged on a surface of the base facing away from the path of motion.

6. The adjusting device according to claim 2, wherein the first coupling section is connected to the base by a cable for the energy and/or signal transmission.

7. The adjusting device according to claim 2, wherein the first and the second coupling section are coupled to each other magnetically.

8. The adjusting device according to claim 7, wherein at least one of the first and second coupling sections comprises at least one permanent magnet or at least one electromagnet.

9. The adjusting device according to claim 2, wherein the first and second coupling sections are couplable to one another by frictional engagement or a positive-fit connection.

10. The adjusting device according to claim 9, wherein one of the first and second coupling sections is configured as a female coupling section and the other of the first coupling sections is configured as a male coupling section.

11. The adjusting device according to claim 10, wherein the female coupling section is configured as a connector receptacle with depressions and/or projections and the male coupling section is configured as a connector with depressions and/or projections.

12. The adjusting device according to claim 2, wherein contacts for the energy and/or signal transmission are arranged in a circular shape in both coupling sections.

13. The adjusting device according to claim 2, wherein at least a portion of the first coupling section is configured to be rotatable and lockable at different rotational positions.

14. The adjusting device according to claim 1, wherein the drive unit is a piezoelectric motor.

15. The adjusting device according to claim 1, wherein the supply line comprises several separate conductors for the energy and/or signal transmission in a common jacket.

16. The adjusting device according to claim 1, wherein the supply line comprises a connector for connection to an external device.

\* \* \* \* \*